United States Patent
Lu et al.

(10) Patent No.: US 8,519,662 B2
(45) Date of Patent: Aug. 27, 2013

(54) METHOD AND APPARATUS FOR CONTROLLING MOTOR TORQUE

(75) Inventors: Haihui Lu, Shanghai (CN); David M. Messersmith, Kenosha, WI (US)

(73) Assignee: Rockwell Technologies, Inc., Mayfield Heights, OH (US)

( * ) Notice: Subject to any disclaimer, the term of this patent is extended or adjusted under 35 U.S.C. 154(b) by 529 days.

(21) Appl. No.: 12/788,030

(22) Filed: May 26, 2010

(65) Prior Publication Data

US 2011/0291596 A1    Dec. 1, 2011

(51) Int. Cl.
*H02P 1/24* (2006.01)

(52) U.S. Cl.
USPC .......................................... 318/727; 318/432

(58) Field of Classification Search
USPC ................. 318/727, 811, 798, 801, 805, 807, 318/432, 434
See application file for complete search history.

(56) References Cited

U.S. PATENT DOCUMENTS

| | | | | |
|---|---|---|---|---|
| 5,068,811 | A | * | 11/1991 | Johnston et al. ............... 700/297 |
| 6,014,006 | A | * | 1/2000 | Stuntz et al. ................... 318/804 |
| 6,362,590 | B2 | * | 3/2002 | Nozari ........................... 318/609 |
| 6,433,506 | B1 | * | 8/2002 | Pavlov et al. .................. 318/804 |
| 7,095,209 | B2 | * | 8/2006 | Thunes et al. ................. 318/825 |
| 7,227,326 | B1 | | 6/2007 | Lu et al. |
| 7,262,578 | B2 | * | 8/2007 | Iotti .......................... 318/400.04 |
| 2009/0058341 | A1 | | 3/2009 | Lu et al. |

* cited by examiner

*Primary Examiner* — Rina Duda

(74) *Attorney, Agent, or Firm* — William R. Walbrun; Boyle Fredrickson, S.C.; John M. Miller

(57) ABSTRACT

The subject matter disclosed herein describes a system for controlling torque in a soft starter. In particular, torque ripple is reduced when transitioning between two different operating modes of a soft starter. A soft starter may include a first operating mode, designed for improved performance during low-speed operation of a motor, and a second operating mode, designed for improved performance during high-speed operation of the motor. However, transitioning between two different operating modes may result in significant transient currents in the motor, which, in turn, produce torque in the motor. The system described herein reduces this transient torque production in the motor.

16 Claims, 6 Drawing Sheets

METHOD AND APPARATUS FOR CONTROLLING MOTOR TORQUE

BACKGROUND OF THE INVENTION

The subject matter disclosed herein relates to the control of electric motors. More specifically, the subject matter discloses an improved transition between operating modes in a soft starter.

Induction motors are widely used electrical machines. The most basic control of an induction motor utilizes a contactor to alternately connect and disconnect the induction motor to a fixed power supply. Contactor control provides a very inexpensive method for starting and stopping a motor. However, upon connection to the power supply, the motor will accelerate up to its rated speed in an unregulated manner, as quickly as possible, and drawing as much current as necessary from the power supply.

In contrast, high performance control of an induction machine is commonly achieved by using a variable frequency drive. A variable frequency drive can regulate the speed of and control the current in a motor. With the addition of a position sensing device, such as an encoder, the variable frequency drive can also regulate speed and current down to zero speed of the motor. Consequently, variable frequency drives permit controlled acceleration and deceleration of a motor, as well as operation at a wide range of operating speeds. However, variable frequency drives and encoders can add significantly to the complexity and expense of a motor control system.

Soft-starters provide yet another option for connecting motors to a power supply. A soft-starter provides a predefined speed profile for the motor during acceleration and deceleration, limiting the current drawn by the motor. While soft-starters typically do not provide the same level of control afforded by a variable frequency drive, they do reduce the wear on a motor and provide a simple, cost-effective means of connecting the motor to the power supply.

Electric soft-starters typically include a solid-state device connected in series between each phase of the power supply and the motor. The solid-state device is selectively turned on and off for a portion of the electrical cycle, controlling the voltage supplied to the motor. Many methods exist for controlling the solid-state devices in soft-starters. However, it has been found that different control methods perform better under different operating conditions. For example, control methods exist that result in improved operation at higher motor speeds while others provide better operation at lower motor speeds.

However, attempting to execute multiple control methods during a single operation of a motor in order to utilize the improved operation of each method at its preferred operating point is not without challenges. Switching between two control methods will result in step or very quick changes in commanded voltage, current, or speed to the motor. Typically significant levels of current and/or torque will result in the motor as the motor attempts to respond to the new control method. Consequently, it would be desirable to provide a soft-starter with an improved transition between operating modes, to facilitate operation of the soft starter in multiple operating modes.

BRIEF DESCRIPTION OF THE INVENTION

The subject matter disclosed herein describes a system for controlling torque in a soft starter. In particular, torque ripple is reduced when transitioning between two different operating modes of a soft starter. The soft starter includes a first operating mode, designed for improved performance during low-speed operation of a motor, and a second operating mode, designed for improved performance during high-speed operation of the motor. The soft starter described herein also includes a transitional operating mode to reduce the transient torque in the motor when switching between the first and second operating modes.

In one embodiment of the invention a method of controlling an alternating current (AC) voltage supplied to an AC motor is disclosed. The method includes determining a phase angle representing the current in the AC motor, determining a flux vector from at least one current signal and from at least one voltage signal, the flux vector having a magnitude and a phase angle representing the flux in the AC motor, and determining the polarity of the torque in the motor according to the current and flux phase angles. The conduction interval of an electronically controlled switching device used to connect the AC voltage to the AC motor is then set according to the polarity of the torque.

Thus it is one feature of the invention that the amount of time the motor is connected to the supply voltage during each electrical cycle may be adjusted in response to torque pulsations in the motor.

As one aspect of the invention, the current phase angle may be determined from at least one current signal, from at least one control signal to the switching device, or a combination thereof. Thus it is another feature of the invention that the angle of the current may be vector may be reliably determined if current signals are too small by estimating the phase angle according to firing events in the converter.

The method may also include the steps of determining a desired conduction interval according to either a magnitude of the current signal or a commanded speed to the motor, setting the conduction interval to a predetermined minimum value in response to a first polarity of the torque, and setting the conduction interval to the desired conduction interval in response to a second polarity of the torque.

In another aspect of the invention the commanded speed may be increasing. When the commanded speed is increasing, the conduction interval is set to the predetermined minimum value in response to a negative polarity of the torque, and the conduction interval is set to the desired conduction interval in response to a positive polarity of the torque. Alternately, the commanded speed may be decreasing. When the commanded speed is decreasing, the conduction interval is set to the predetermined minimum value in response to a positive polarity of the torque, and the conduction interval is set to the desired conduction interval in response to a negative polarity of the torque.

Thus it is another feature of the invention that the motor continues operating in the same manner it was operating during the first operating mode during the transition between operating modes.

The method may further include initial steps of controlling the AC motor according to a first operating mode and initiating a transition to a second operating mode. The step of initiating the transition to a second operating mode may be conditioned on reaching a predefined speed level. When the transition between operating modes is complete, the AC motor may be controlled according to a second operating mode.

According to another embodiment of the invention, a method of controlling an AC motor is disclosed. A program executes in a soft-starter in a first operating mode wherein an output voltage to the motor is generally proportional to a fundamental frequency of rotation of the motor. The program executes in the soft-starter in a second operating mode wherein an output voltage to the motor is generally responsive to an estimated speed of rotation of the motor. The program further executes a transitional operating mode between the first and the second operating modes wherein the output voltage to the motor is generally responsive to the polarity of the torque in the motor.

According to yet another embodiment of the invention, an AC power converter used to operate an AC motor includes an AC power input having at least one phase voltage, at least one electronically controlled switch selectively connecting each phase voltage to a phase of the motor according to a control signal, at least one current sensor providing a phase current signal from the motor, and a processor receiving the current signal and executing a stored program. The program may execute to estimate a flux in the motor, determine a polarity of the torque in the motor according to the current signal and the estimated flux, and set a conduction interval of the electronically controlled switching device according to the polarity of the torque.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
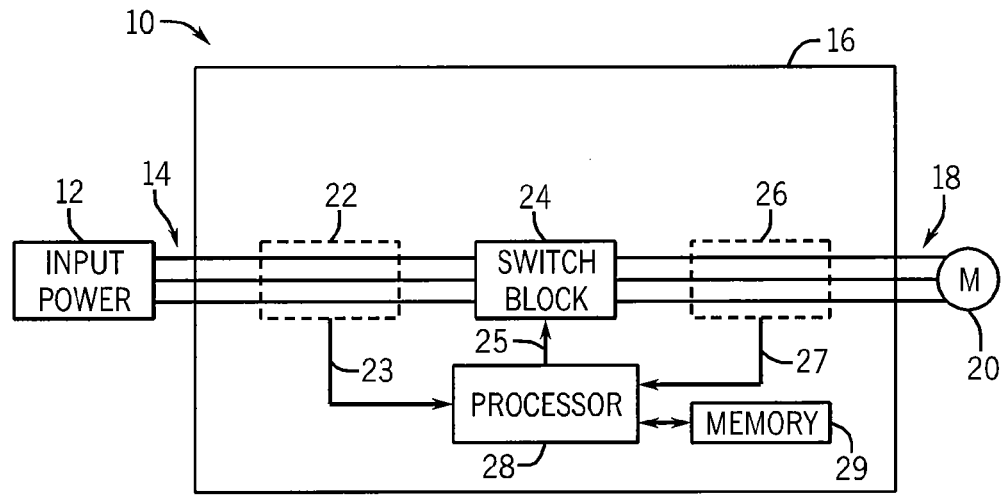
FIG. 1 is a block diagram representation of a power converter according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Referring initially to FIG. 1, a motor control system 10 generally includes an input power source 12, a motor controller 16, and a motor 20. The input power source 12 is selected according to the type of motor 20 used and may be any suitable power source known to one skilled in the art. Preferably, the input power source 12 is a connection to a three-phase utility voltage. Input leads 14 connect the motor controller 16 to the input power source 12.

The motor controller 16 typically includes a processor 28 and a memory storage device 29. The processor 28 executes a program stored in memory 29 to provide at least one control signal 25 in response to input signals 23 and/or feedback signals 27. An input voltage sensing section 22 may generate the input signals 23, providing the processor 28 with magnitude and phase angle data corresponding to the input voltage. A feedback section 26 may generate feedback signals 27, which may provide the processor 28 with current and/or voltage signals output to the motor 20. The control signals 25 may be used to selectively energize switching devices, such as solid-state components, in the switch block 24 to regulate the current and/or voltage output to the motor 20. Motor leads 18 connect the motor 20 to the motor controller 16.

Figure 2:
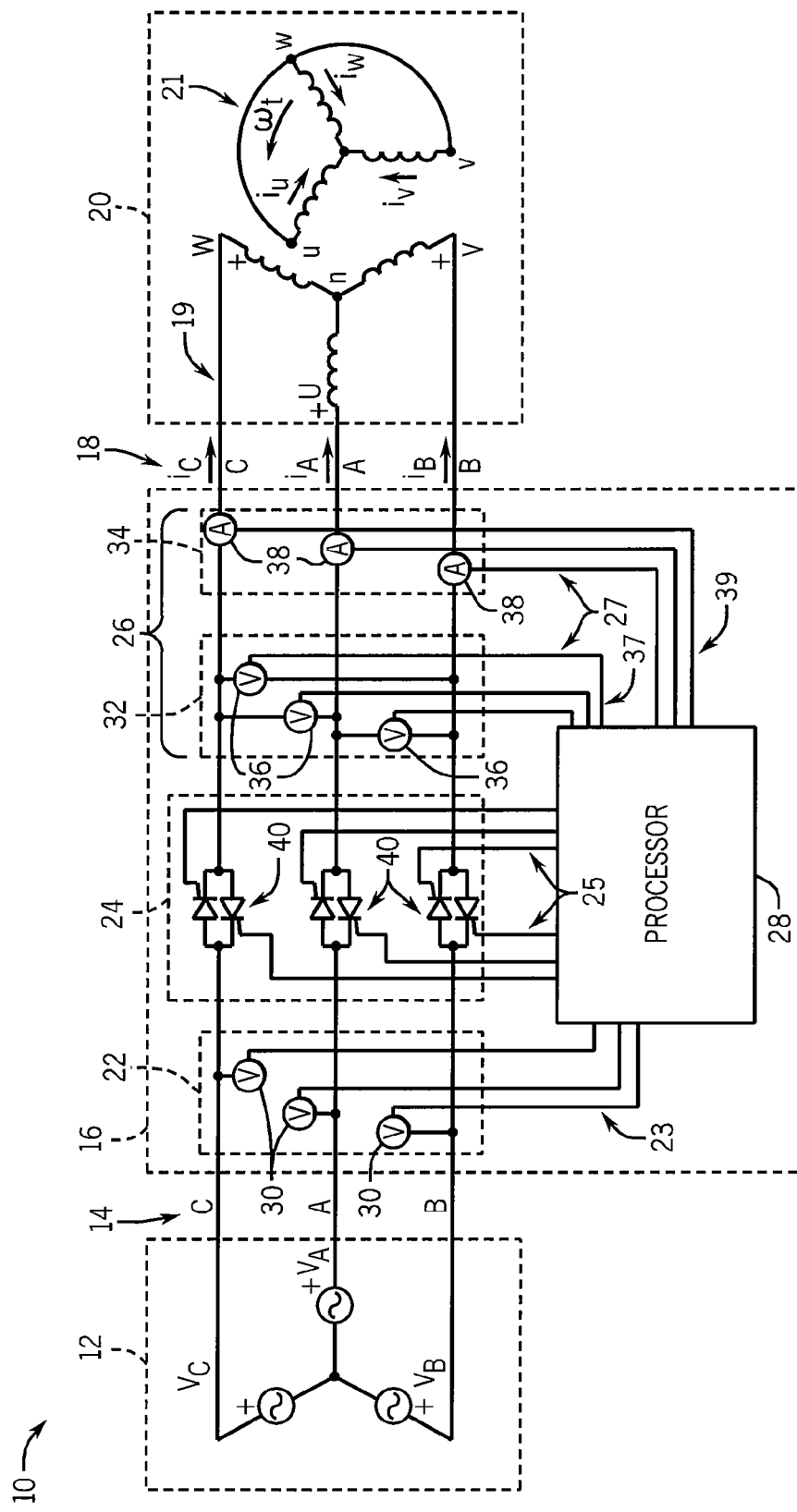
FIG. 2 is a schematic representation of a power converter according to one embodiment of the present invention.

Referring next to FIG. 2, one embodiment of the motor control system 10 is illustrated. The input power source 12 is a three-phase, AC voltage. The power supply provides sinusoidally varying voltages, $V_a$, $V_b$, and $V_c$, alternating, for example, at either 50 or 60 Hz to the motor controller 16 via input leads 14. Optionally, other embodiments may include a power source 12 supplying voltage having a different number of phases or operating at a different frequency.

The input voltage sensing section 22 includes at least one voltage sensing device 30 and provides input signals 23 to the processor 28 representative of the input power source 12. As illustrated, a separate voltage sensing device 30 may be connected to each input phase voltage, $V_a$, $V_b$, or $V_c$. The voltage sensing device 30 may optionally measure either line-to-line voltage or line-to-ground voltage.

The feedback sensing section 26 may include a voltage feedback section 32, a current feedback section 34, or both as required by the control program executing on the processor 28. The voltage feedback section 32 may include one or more voltage sensing devices 36 and provide voltage feedback signals 37 to the processor 28 representative of the voltage output to the motor 20. As illustrated, a separate voltage sensing device 36 may be connected to each output phase voltage, $V_u$, $V_v$, or $V_w$. The voltage sensing device 36 may optionally measure either line-to-line voltage or line-to-ground voltage. Similarly, a current sensing device 38 may be used to measure the output current at each motor lead 18. The current sensing section 34 may include one or more current sensing devices 38 and provide current feedback signals 39 to the processor 28 representative of the output current drawn by the motor 20. Optionally, one or more of the voltage feedback signals 37 and the current feedback signals 39 may be calculated based on a measured feedback signal 27, a value calculated within the processor 28, or a combination thereof.

The switch block 24 preferably includes electronically controlled switching devices to selectively connect the input leads 14 to the motor leads 18. As illustrated, each phase includes a pair of silicon controlled rectifiers (SCRs) 40. The first SCR 40 of the pair is connected in parallel with, and with an opposing polarity to, the other SCR in the pair. The pair of SCRs 40 is connected in series between the input leads 14 and the output leads 18. Optionally, thyristors, power MOSFETs, IGBTs, or other solid-state switching devices, as would be known in the art, may be used. The trigger of each SCR is connected to and enabled by one of the control signals 25 generated by the processor 28.

The motor 20 is connected to the motor controller 16 via the motor leads 18. The three-phase induction motor, as shown, includes stator windings, U, V, and W. The motor controller 16 regulates at least one of the voltage or current output to the stator 19, which, in turn, causes the rotor 21 to spin.

Figure 3:
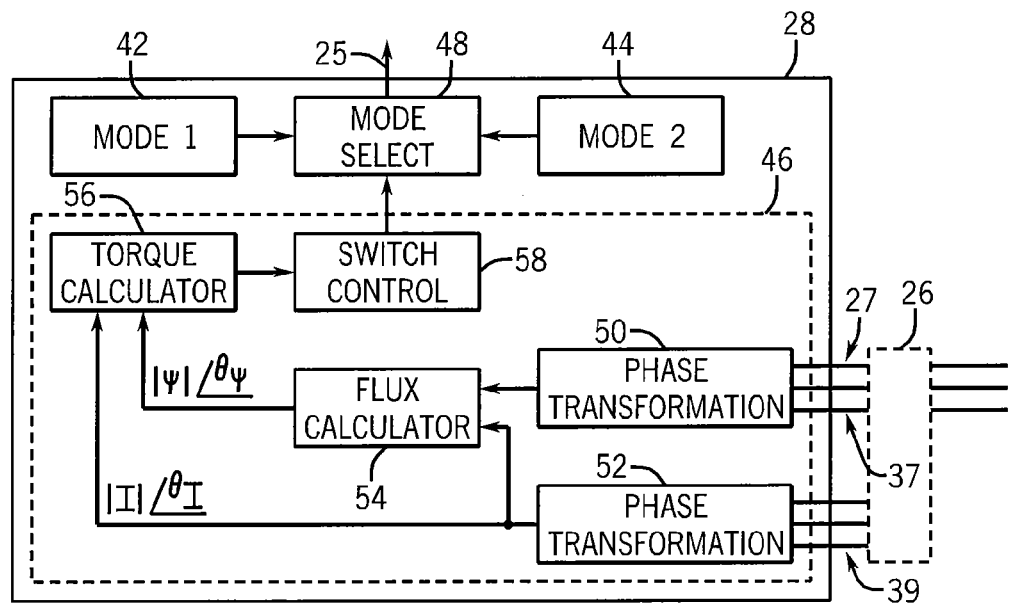
FIG. 3 is a block diagram representation of the control system according to one embodiment of the present invention.

Referring then to FIG. 3, the processor 28 executes a control program to provide the control signals 25 to the SCR pairs 40. The control program includes at least one, and preferably, includes three operating modes, 42, 44, and 46. A first operating mode 42 may be, for example, configured to operate at low speed and may be an open-loop algorithm, for example a volts-per-hertz like algorithm. An open-loop algorithm generates a voltage waveform to the motor according to a speed command without receiving a speed feedback signal. A volts-per-hertz algorithm varies the magnitude of the output voltage in a generally linear manner as the commanded output frequency, or speed, of the motor varies. The volts-per-hertz algorithm may vary the voltage proportionally to the output frequency or, optionally, the algorithm may vary the voltage at different rates over different ranges of output frequency.

A second operating mode 44, for example, may be a closed-loop algorithm configured to operate at higher speeds. A closed-loop algorithm generates a voltage waveform to the motor according to an error signal generated by comparing a speed command to a speed feedback signal. The speed feedback signal may be provided by an encoder or other such hardware device, but preferably, the speed feedback signal is estimated within the processor 28 using voltage and current feedback signals, 37 and 39. Optionally, the first and second operating modes, 42 and 44, may be configured in any order and any suitable control method may be used during the first or second operating mode, 42 or 44, as would be known in the art.

A transitional mode 46 is included to facilitate switching between the first and second operating modes, 42 and 44. The transitional mode receives feedback signals 27 representing the voltage and current present at the motor. Preferably, these feedback signals 27 are initially in a three-phase reference frame, representing the voltage and current, for example, on the U, V, and W phases of the motor 20. The three-phase voltage and current signals, 37 and 39, are converted to two-phase signals by phase transformation blocks, 50 and 52. The conversion may use the Park transformation, the Clarke transformation, or a derivative of either transformation, as is known in the art. The two-phase signals may be expressed as vectors having a magnitude and phase angle to represent the voltage and current present at the motor. The voltage and current vectors are then used as inputs to a flux calculator 54. The estimated flux vector, output from the flux calculator 54, and the current vector are used as inputs to a torque calculator 56. The polarity of the torque, output from the torque calculator 56, is provided as an input to the switch control function 58. The switch control function 58 outputs the control signals 25 to the SCR pairs 40 when the transitional mode 46 is active. A mode select function 48 selectively enables one of the three operating modes, 42, 44, or 46, and passes the output of the selected mode, 42, 44, or 46 as the control signals 25 to the SCRs 40.

Figure 4:
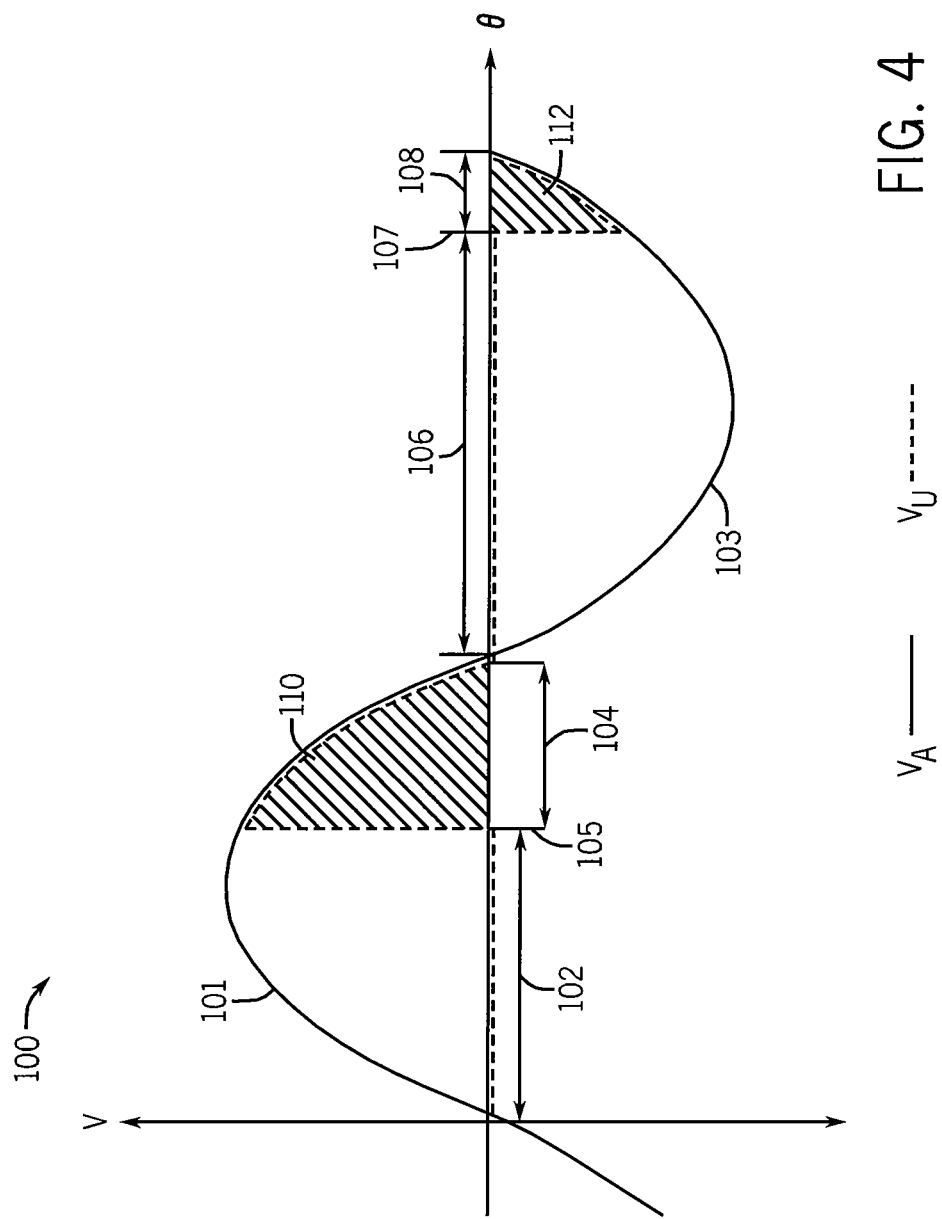
FIG. 4 is an example of a single cycle for one phase of input and output voltage waveforms through the power converter.

In operation, the motor controller 16 controls the motor 20 by selectively connecting the motor 20 to the input power source 12. Referring to FIGS. 2 and 4, operation of a single phase of the motor controller 16 over one electrical cycle is illustrated. The SCR pairs 40 work together to enable conduction during each half cycle of the input voltage, one SCR selectively conducting during the positive half cycle 101, and the other SCR selectively conducting during the negative half cycle 103. Each SCR remains in a normally off state, represented by time intervals 102 and 106, preventing conduction from the input power source 12, represented by phase voltage $V_a$, to the motor 20, represented by phase voltage $V_u$. A control signal 25 is used to turn on each SCR, for example at time 105 during the positive half cycle 101 and at time 107 during the negative half cycle 103. Once enabled, the SCR will remain on until the voltage across the SCR reverses polarity, reverse biasing the SCR. As a result, once the SCR is turned on, it will continue conducting for the remainder of each half cycle. The shaded portions, 110 and 108, indicate the time during which an SCR is conducting.

The electrical angle of the input voltage corresponding to the point at time, 105 or 107, at which each SCR is switched on is also known as the conduction angle. The time interval, 104 or 108, during which the SCR remains on is also known as the conduction interval. Although, the duration of the conduction intervals, 104 and 108, for each of the positive and negative half cycles, 101 and 103, are often the same, the duration of each conduction interval, 104 and 108, is independently controlled and may vary from the positive to the negative half cycle, 101 or 103. When full voltage is desired, each SCR is enabled at the start of the half cycle and conducts throughout the entire half cycle. Optionally, full conduction may be achieved by including a bypass contactor, not shown, in parallel to each SCR pair 40, which can be energized to directly connect the input voltage, $V_a$, to the output voltage, $V_u$.

Figure 5:
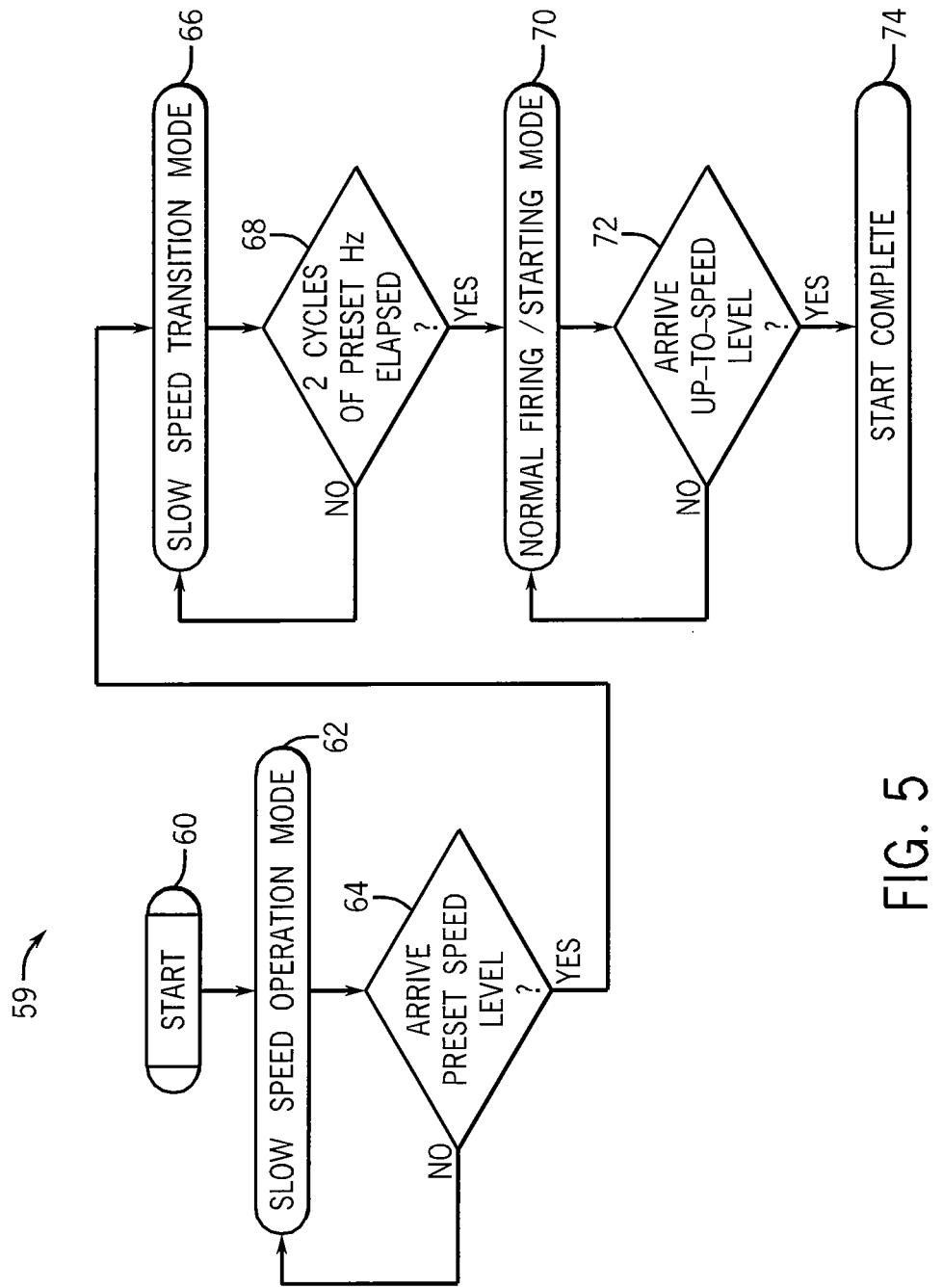
FIG. 5 is a flowchart illustrating a motor start-up sequence according to the control system of FIG. 3.

Referring next to FIG. 5, an exemplary start-up sequence 59, bringing the motor from a stop up to a desired operating speed, is illustrated. The different states shown may be implemented in the mode select function 48 to selectively enable the operating modes, 42, 44, or 46, shown in FIG. 3. The motor controller 16 receives a start command 60 from an external source. The start command, at step 60, may be provided by any suitable input, including but not limited to, a digital input, a serial command message, a networked command message, or by an operator interface connected to the motor controller 16. In step 62, the motor controller 16 begins generating control signals 25 to control the voltage supplied to the motor 20 according to a first operation mode 42. The first operating mode 42 continues operation until a predetermined threshold, such as a time interval or commanded speed to the motor 20, is reached, as illustrated by step 64. Once the preset speed level is reached, the start-up sequence 59 then enters the slow speed transition mode 46, as shown at step 66. The slow speed transition mode 46 similarly continues operation until another predetermined threshold is reached. As shown by step 68, the start-up sequence 59 continues operating in the transition mode 46 through two electrical cycles of the motor 20 at the preset motor speed command. The start-up sequence 59 then begins executing the normal, or second, starting mode 44 at step 70. According to step 72, the start-up sequence 59 continues executing according to the second operating mode 44 until the motor 20 has reached the desired operating speed. As shown in step 74, the start-up sequence 59 is then complete.

Figure 7:
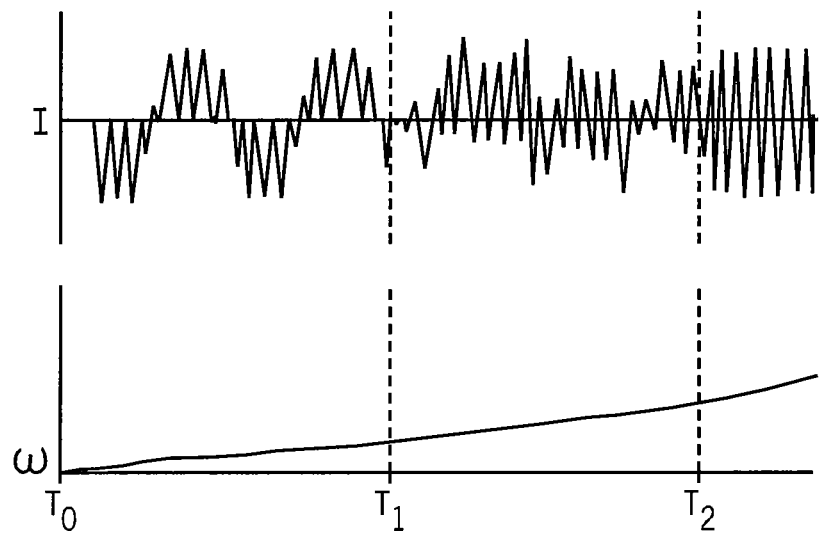
FIG. 7 is a graph showing motor current and motor speed while starting the motor according to one embodiment of the present invention.

As previously described, the SCR's selectively connect the input power source 12 to the motor 20 for a portion of each positive and negative half-cycle of the input voltage. Because the input power source is typically a utility grid, the input power source will operate at 50 or 60 Hz. Although operating modes may be configured to produce output voltages having fundamental output frequencies at various operating points, the voltage necessarily has an underlying 50 or 60 Hz component. The frequency components present in the output current are illustrated in FIG. 7. According to one embodiment of the present invention, the first operating mode 42 executes a volts-per-hertz like control algorithm between times $T_0$ and $T_1$. The first operating mode 42 generates control signals 25 to the SCRs such that a sine-modulated current waveform results. The sine-modulated waveform has a fundamental frequency corresponding to a commanded output frequency of the motor along with a frequency component at the utility input of 50 or 60 Hz.

The second operating mode 44 employs a speed controlled algorithm after time $T_2$. The second operating mode 44 similarly generates control signals 25 such that a sinusoidal current waveform results, having a primary frequency component at the utility input of 50 or 60 Hz. Due to the difference in control characteristics of each operating mode, a direct changeover in operating mode between the first and second operating modes, 42 and 44, would result in a step change in commanded output voltage. A step change is an instantaneous, or very sharp, change in commanded voltage, which typically results in high currents, voltages, and/or resultant torques in the motor as the motor attempts to change operation from the first mode 42 to the second mode 44. These high torques may produce sudden and undesirable changes in speed and deviations from the commanded speed. The transition mode 46, operating between times $T_1$ and $T_2$, reduces or eliminates the opportunity for high currents, voltage, and torques and produces a continued smooth speed output at the motor.

Figure 6:
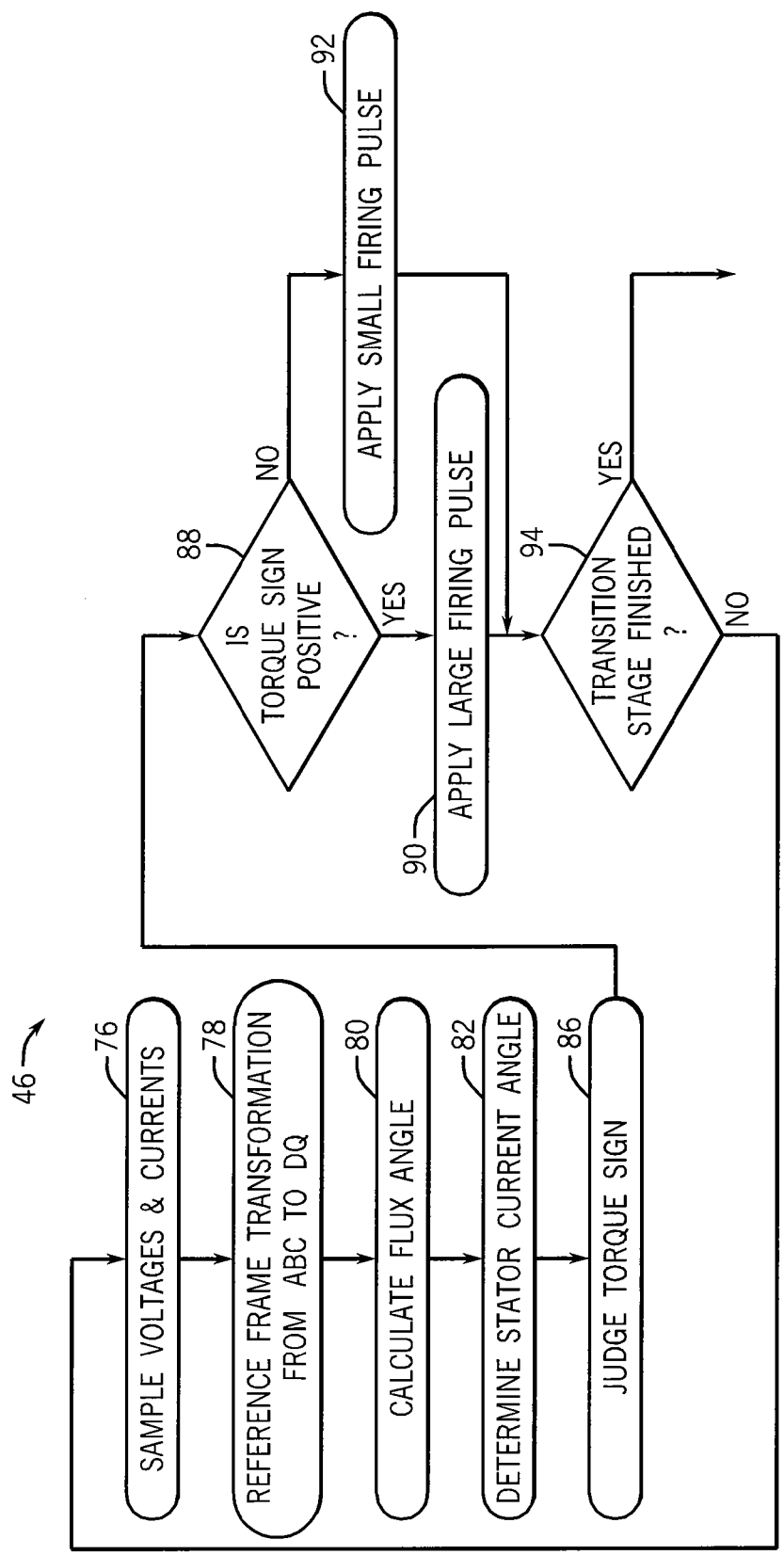
FIG. 6 is a flowchart illustrating the sequence of operation during the transition mode of FIG. 5.

Referring next to FIG. 6, the steps of the slow speed transition mode 46 are illustrated. At step 76, the feedback signals 27 are obtained. Voltage feedback signals 37 and current feedback signals 39 are obtained from each of the respective voltage sensors 36 and current sensors 38 present in the motor controller 16. Alternately, voltage and current values for any phase not having a voltage or current sensor, 36 or 38, may be calculated based on the acquired feedback signals 27 or on variables stored internally within the processor 28 and memory 29 of the controller 16.

Figure 8:
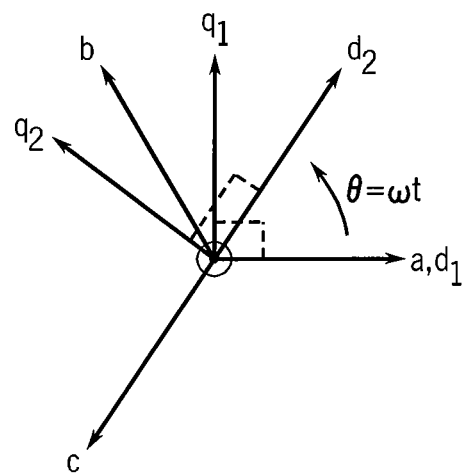
FIG. 8 is an illustration of the phase relationship between a stationary, three-phase reference frame, a stationary, two-phase reference frame, and a rotating, two-phase reference frame.

Having sampled or calculated each of the phase voltage and current signals, 37 and 39, phase transformation functions, 50 and 52, convert the sampled signals into a two-phase reference frame at step 78, such as the direct and quadrature axis (d-q) reference frame. As illustrated in FIG. 8, the d-q reference frame may optionally be a stationary reference frame, identified by $d_1$-$q_1$, or a rotating reference frame, identified by $d_2$-$q_2$, that rotates at the electrical frequency of the motor 20. Preferably, the phase transformation functions, 50 and 52, convert the sampled signals into a stationary d-q reference frame. The two-phase signals may further be expressed as a vector, having a magnitude and a phase angle within the d-q reference frame.

At step 80, the voltage and current values in the d-q reference frame may be used by the flux calculator 54 to determine a vector representation of the flux in the motor 20. It is contemplated that a vector representation of the flux in either the stator 19 or the rotor 21 may be calculated. For example, the flux vector for the rotor 21 of the motor 20 is calculated according to equation 1.

$$K_r \hat{\vec{\psi}}_r = \frac{1}{s}(\vec{V}_s - R_s \vec{i}_s) - L\vec{i}_s \quad (1)$$

where:
$K_r$=coupling factor;
$\hat{\vec{\psi}}_r$=rotor flux vector;
$\vec{V}_s$=stator voltage vector;
$R_s$=stator resistance;
L=motor inductance; and
$\vec{i}_s$=stator current vector.

Similarly, the flux vector for the stator 19 of the motor 20 is calculated according to equation 2.

$$\vec{\psi}'_s = \frac{1}{s+\omega_c}(\vec{V}_s - R_s \vec{i}_s) \quad (2)$$

where:
$\omega_c$=corner frequency;
$\vec{\psi}'_s$=stator flux vector;

As previously indicated, the flux calculator 54 obtains the voltage and current vectors used in equations 1 and 2 as input signals. The stator resistance and motor inductance are previously known or measured values stored in the memory device 29 and retrieved by the flux calculator 54 for determination of the flux vector. The flux vector output by the flux calculator 54 may be represented by a magnitude and angle.

After calculating the flux vector, the stator current angle is determined at step 82. The stator current angle may be directly obtained from the current vector output by the phase transformation 52. Optionally, the stator current angle may also be estimated according to the upcoming firing event for the SCR pairs 40.

The value of the estimated stator current angle is preferably fixed between each SCR firing event. As previously discussed, the length of time during any particular half cycle that an SCR connects the input source 12 to the motor 20 varies according to the desired output voltage; however, the sequence in which the SCRs are enabled remains constant and is determined according to the phase angle and the phase sequence of the input power 14. Preferably, the stator current angle is estimated to be one of six angles, spaced at sixty degree intervals, based on the upcoming SCR firing event, as illustrated in table 1 below.

TABLE 1

Current Angle Estimation

| SCR firing event | Input Power Positive Sequence (ABC) | | Input Power Negative Sequence (CBA) | |
|---|---|---|---|---|
| | Conducting SCR pairs | Estimated current angle | Conducting SCR pairs | Estimated current angle |
| A+ | A+ B− | 60° | A+ C− | 120° |
| A− | A− B− | −120° | A− C+ | −60° |
| B+ | B+ C− | 180° | B+ A− | −120° |
| B− | B− C+ | 0° | B− A+ | 60° |
| C+ | C+ A− | −60° | C+ B− | 0° |
| C− | C− A+ | 120° | C− B+ | 180° |

At step 86, the polarity of the torque is determined. The previously determined stator current angle and the flux vector, output by the flux calculator 54, are provided as inputs to the torque calculator 56. The torque calculator 56 may determine the value of the torque produced in the motor 20, for example, by equation 3, given below. As may be observed in equation 3, the value of the angle, θ, determines the sign, or the polarity, of the torque in the motor 20.

$$T_e = \frac{1}{K_r} \vec{\psi}_r \otimes \vec{i}_s = \frac{1}{K_r} |\vec{\psi}_r| * |\vec{i}_s| * \sin\theta \qquad (3)$$

where:
$T_e$=electromagnetic torque produced by the motor; and
θ=phase difference between the phase angle of the rotor flux vector and the phase angle of the stator current vector.

Although equation 3 illustrates the torque being calculated using the rotor flux vector, the torque may similarly be calculated using the stator flux vector.

Having identified the polarity of the torque, the motor controller 16 then determines, in steps 88-92, the length of the conduction interval for the next electrical cycle. First, the motor controller identifies the polarity of the torque. If the torque is positive, the conduction interval or firing angle is set to a first value. If the torque is negative, the conduction interval or firing angle is set to a second, smaller value. The first and second values may be selected according to predetermined constant values. Optionally, the first and second values may be selected according to previously calculated values, for example the speed reference or a measured current value at the end of the first operating mode 42. The first value may be held at the previously calculated value and the second value may be a percentage of the previously calculated value. Reducing the voltage supplied to the motor 20 during time intervals where negative torque would be produced by the motor 20 allows the motor to continue increasing in speed while the transitional mode 46 is executing. The transitional mode 46 continues executing until the predefined set point is reached, as shown in step 94.

The steps described above and illustrated by FIGS. 5 and 6 for an exemplary start-up sequence 59, may similarly be applied to a stopping sequence where the motor is slowed to a stop from a desired operating speed. During a stopping sequence, the process would transition from the second operating mode 44 to the first operating mode 42 using the transition mode 46. Rather than limiting negative torque to the motor as down during a start-up sequence 59, the process would limit positive torque to the motor. Just as during the start-up sequence, first and second values of the desired conduction interval or firing angle during the next electrical cycle are determined. However, in contrast to the start-up sequence, the first value, corresponding to a positive torque, is less than the second value, corresponding to a negative torque. The first and second values may be selected according to predetermined constant values. Optionally, the first and second values may be selected according to previously calculated values, for example the speed reference or a measured current value at the end of the second operating mode 44. The second value may be held at the previously calculated value and the first value may be a percentage of the previously calculated value. Reducing the voltage supplied to the motor 20 during time intervals where positive torque would be produced by the motor 20 allows the motor to continue decreasing in speed while the transitional mode 46 is executing.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A soft starter for connection between an AC power source and an AC motor, comprising:
    an input configured to be connected to the AC power source, wherein the AC power source has at least one phase;
    an output configured to be connected to the AC motor, wherein the AC motor has at least one phase;
    at least one electronically controlled switch selectively connecting each phase from the AC power source to one of the phases of the motor according to a control signal;
    at least one current sensor providing a phase current signal from the motor; and
    a processor receiving the current signal and executing a stored program, the program executes to:
        estimate a flux in the motor;
        determine a polarity of the torque in the motor according to the current and the estimated flux in the motor; and
        set a conduction interval of the electronically controlled switch according to the polarity of the torque.

2. The AC power converter of claim 1 wherein the current is determined from the current signal.

3. The AC power converter of claim 1 wherein the current is determined from at least one control signal to the switching device.

4. The AC power converter of claim 1 wherein the program sets the conduction interval by performing the steps of:
    determining a desired conduction interval according to one of a magnitude of the current signal and a commanded speed to the motor;
    setting the conduction interval to a predetermined minimum value in response to a first polarity of the torque; and
    setting the conduction interval to the desired conduction interval in response to a second polarity of the torque.

5. The AC power converter of claim 4 wherein the commanded speed is increasing, the conduction interval is set to the predetermined minimum value in response to a negative polarity of the torque; and the conduction interval is set to the desired conduction interval in response to a positive polarity of the torque.

6. The AC power converter of claim 4 wherein the commanded speed is decreasing, the conduction interval is set to the predetermined minimum value in response to a positive polarity of the torque; and the conduction interval is set to the desired conduction interval in response to a negative polarity of the torque.

7. The AC power converter of claim 1 wherein the program initially executes to:
    control the AC motor according to a first operating mode; and
    initiate a transition to a second operating mode.

8. The AC power converter of claim 7 wherein the program further executes a final step to complete the transition to the second operating mode.

9. A method of controlling a soft starter, the soft starter configured to be connected between an AC power source and an AC motor, wherein each of the AC power source and the AC motor has at least one phase, the method comprising the steps of:

obtaining a signal corresponding to a phase current in the AC motor with a processor in the soft starter;

estimating a flux in the AC motor with the processor;

determining a polarity of the torque in the AC motor with the processor as a function of the signal corresponding to the phase current and the estimated flux in the motor;

setting a conduction interval for at least one electronically controlled switch as a function of the polarity of the torque, wherein each electronically controlled switch selectively connects an input of the soft starter to an output of the soft starter and wherein the input is configured to be connected to the AC power source and the output is configured to be connected to the AC motor.

10. The method of claim 9 wherein the step of setting the conduction interval further comprises the steps of:

determining a desired conduction interval according to one of the signal corresponding to the phase current in the AC motor and a commanded speed to the motor;

setting the conduction interval to a predetermined minimum value in response to a first polarity of the torque; and setting the conduction interval to the desired conduction interval in response to a second polarity of the torque.

11. The method of claim 10 wherein the commanded speed is increasing, the conduction interval is set to the predetermined minimum value in response to a negative polarity of the torque; and the conduction interval is set to the desired conduction interval in response to a positive polarity of the torque.

12. The method of claim 10 wherein the commanded speed is decreasing, the conduction interval is set to the predetermined minimum value in response to a positive polarity of the torque; and the conduction interval is set to the desired conduction interval in response to a negative polarity of the torque.

13. The method of claim 9 further comprising the initial steps of:

controlling the AC motor according to a first operating mode; and initiating a transition to a second operating mode.

14. The method of claim 13 wherein the step of initiating the transition to a second operating mode is conditioned on reaching a predefined speed level.

15. The method of claim 13 further comprising a final step of completing the transition to the second operating mode.

16. The method of claim 15 wherein the transition to the second operating mode is completed after a predefined time.

* * * * *